United States Patent [19]

Kawasaki

[11] 4,097,877
[45] Jun. 27, 1978

[54] DUAL-FUNCTION VARIABLE RESISTOR IN AUTOMATIC/MANUAL CAMERA SHUTTER CONTROL CIRCUIT

[75] Inventor: Masahiro Kawasaki, Tokyo, Japan

[73] Assignee: Asahi Kogaku Kogyo Kabushiki Kaisha, Tokyo, Japan

[21] Appl. No.: 740,326

[22] Filed: Nov. 9, 1976

[30] Foreign Application Priority Data

Nov. 11, 1975 Japan .................. 50-153233[U]

[51] Int. Cl.$^2$ ................... G03B 7/08; G03B 7/00
[52] U.S. Cl. .................... 354/50; 354/51; 354/60 L
[58] Field of Search ............... 354/36–38, 354/50, 51, 60 R, 24, 53, 60 E, 60 L, 156, 258

[56] References Cited

U.S. PATENT DOCUMENTS 3,968,502   7/1976   Shiozawa ............... 354/51 X

Primary Examiner—L. T. Hix
Assistant Examiner—William B. Perkey
Attorney, Agent, or Firm—Sughrue, Rothwell, Mion, Zinn and Macpeak

[57] ABSTRACT

A shutter control circuit for a single lens reflex camera includes a capacitor 8 for storing a voltage proportional to the measured object brightness value through a first switch 7, a second switch 14 for selecting the automatic or manual mode, and a variable resistor 12 having two sliding contact terminals A and B coupled to a third switch 11 controlled by the position of the reflex mirror 26. In the automatic mode one of the sliding contact terminals B is set to the difference between the f-stop and film sensitivity values, which influences the capacitor charge, which in turn controls the exposure time through a first position of the selecting switch. In the manual mode the other sliding contact terminal A directly controls the exposure time through a second position of the selecting switch.

1 Claim, 2 Drawing Figures

DUAL-FUNCTION VARIABLE RESISTOR IN AUTOMATIC/MANUAL CAMERA SHUTTER CONTROL CIRCUIT

BACKGROUND OF THE INVENTION

This invention relates to a dual-function variable resistor employed in both the automatic shutter control circuit and the manual shutter control circuit of a camera.

In an automatic shutter control circuit, it is necessary to electrically process information on the f-stop or aperture value, the film sensitivity, and the measured brightness of an object to be photographed, and therefore a variable resistor to set the stop value and a variable resistor to set the film sensitivity (or a single variable resistor combining these settings) are required. In a manual shutter control circuit, a variable resistor to set the shutter speed is required.

In the prior art automatic and manual shutter control circuits, separate variable resistors are provided to set the stop value, the film sensitivity, and the shutter speed. This is disadvantageous in terms of both space requirements and cost.

SUMMARY OF THE INVENTION

Accordingly, it is an object of this invention to provide an automatic and manual camera shutter control circuit incorporating a common variable resistor to set both the shutter speed in the manual mode as well as the stop value and/or film sensitivity in the automatic mode, to thereby reduce both the space requirements and the cost of the camera.

Briefly, and in accordance with the present invention, a shutter control circuit for a single lens reflex camera includes a capacitor for storing a voltage proportional to the measured object brightness value through a first switch, a second switch for selecting the automatic or manual mode, and a variable resistor having two sliding contact terminals coupled to a third switch controlled by the position of the reflex mirror. In the automatic mode one of the sliding contact terminals is set to the difference between the f-stop and film sensitivity values, which influences the capacitor charge, which in turn controls the exposure time through a first position of the selecting switch. In the manual mode the other sliding contact terminal directly controls the exposure time through a second position of the selecting switch.

In this manner, the single variable resistor implements a dual function by serving to set camera control values in both the automatic and manual modes.

DETAILED DESCRIPTION OF THE PREFERRED EMBODIMENT

Figure 1:
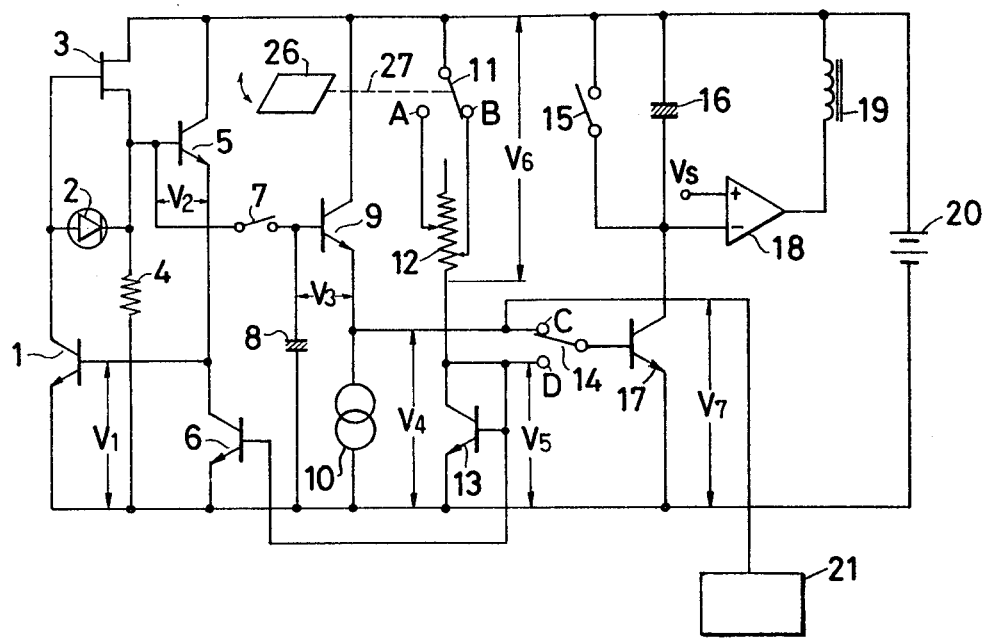
FIG. 1 shows a schematic circuit diagram of an automatic/manual camera shutter control system according to this invention.

In FIG. 1, reference numeral 1 designates a logarithmic compression transistor, the collector of which is connected to the gate of a field-effect transistor 3 having a self-biasing circuit formed by a photo diode 2 and a resistor 4. The base of a transistor 5, driven in a constant current mode by a transistor 6, is connected to the source of the field-effect transistor 3. Furthermore, a memory capacitor 8 and the base of a transistor 9 driven in a constant current mode by a constant current source 10 are also connected to the source of the field-effect transistor 3 through a memory switch 7.

Reference numeral 12 designates a variable resistor in accordance with this invention. The sliding terminal A thereof is for setting shutter speed in a manual mode, while the sliding terminal B is for setting stop value and film sensitivity in an automatic mode. The terminals A and B are provided with a switch 11 whose armature is transferred from terminal B to terminal A in synchronization with the raising of the camera reflex mirror 26 by a simple mechanical linkage, shown schematically at 27. One terminal of the variable resistor 12 is connected to a diode-wired transistor 13. The collector terminal D of the transistor 13 and the emitter terminal C of the transistor 9 are connected to an automatic-manual shutter change-over switch 14, the armature of which is connected to the base of a transistor 17. A time constant capacitor 16, a shutter release switch 15, and the negative or inverting terminal of a comparator 18 are connected to the collector of transistor 17. A shutter control magnet 19 is connected to the output of the comparator 18. Reference numerals 20 and 21 designate a power supply and a meter indicator circuit, respectively.

In operation, by reason of the feedback from the collector to the base of transistor 1, which is driven in a constant current mode by the photoelectric current $i_P$ of the photo diode 2, through the field-effect transistor 3 and the transistor 5, the base-emitter voltage $V_1$ of transistor 1 corresponds to the apex (Additive Photographic Exposure system) value $B_V$ of the brightness of an object to be photographed. The base-emitter voltage $V_1$ of transistor 1 is given by:

$$V_1 = \frac{KT}{q} \ln \frac{i_P}{i_0} + V_{BE}(i_0), \quad (1)$$

where:

$K$ is a Holtzmann constant,
$T$ is the absolute temperature,
$q$ is the electron charge, and
$V_{BE}(i_0)$ is the base-emitter voltage when the collector current is $i_0$.

Further, the photoelectric current $i_P$ of the photo diode 2 is represented by the following equation with respect to the apex value $B_V$ of the object brightness:

$$i_P = i_{P0} 2^{B_V}, \quad (2)$$

where $i_{P0}$ is the photoelectric current when $B_V = 0$. Substituting equation (2) in equation (1) yeilds:

$$V_1 = \frac{KT}{q} \cdot B_V \ln 2 + \frac{KT}{q} \ln \frac{i_{P0}}{i_0} + V_{BE}(i_0) \quad (3)$$

Assume now that the resistances at the sliding terminals A and B of the variable resistor 12 are $R_1$ and $R_2$, respectively, and that the voltage across the variable resistor is $V_6$. When the armature of switch 11 is engaged with sliding terminal B, the emitter current $i_1$ of transistor 5 is:

$$i_1 = V_6/R_2, \text{ and} \quad (4)$$

the base-emitter voltage $V_2$ of transistor 5 is:

$$V_2 = \frac{KT}{q} \ln \frac{i_1}{i_0} + V_{BE}(i_0) \qquad (5)$$

On the other hand, if the current of the constant current source 10 is $i_3$, then the base-emitter voltage $V_3$ of transistor 9 is:

$$V_3 = \frac{KT}{q} \ln \frac{i_3}{i_0} + V_{BE}(i_0) \qquad (6)$$

As the armature of switch 11 is transferred over to terminal A from terminal B in timed sequence after the closed memory switch is opened, the emitter voltage $V_4$ of transistor 9 is:
$V_4 = V_1 + V_2 - V_3$, and substituting in equations (3), (5) and (6) yields:

$$V_4 = \frac{KT}{q} \cdot B_V \cdot \ln 2 + \frac{KT}{q} \ln \frac{i_{F0}}{i_0} \cdot \frac{i_1}{i_3} + V_{BE}(i_0) \qquad (7)$$

If resistance $R_2$ satisfies the following equation with respect to the difference between the apex values $A_V$ and $S_V(A_V - S_V)$ of stop value and film sensitivity:

$$R_2 = R_3 \cdot 2^{(A_V - S_V)}, \qquad (8)$$

where $R_3$ is the resistance when $(A_V - S_V) = 0$, then equation (7) can be rewritten as follows:

$$V_4 = \frac{KT}{q}(B_V + S_V - A_V) \ln 2 + \qquad (9)$$

$$\frac{KT}{q} \ln \frac{i_{F0}}{i_0} \cdot \frac{V_6}{i_3 R_3} + V_{BE}(i_0)$$

The relation between the collector current $i_4$ of transistor 17 and the base-emitter voltage $V_4$ is:

$$V_4 = \frac{KT}{q} \ln \frac{i_4}{i_0} + V_{BE}(i_0) \qquad (10)$$

Further, the relation between the collector current $i_4$ of transistor 17 and the apex value $T_V$ of the exposure time is:

$$i_4 = i_5 \cdot 2^{T_V}, \qquad (11)$$

where $i_5$ is the collector current of transistor 17 when $T_V = 0$, and substituting equation (11) in equation (10) yeilds:

$$V_4 = \frac{KT}{q} \cdot T_V \ln 2 + \frac{KT}{q} \ln \frac{i_5}{i_0} + V_{BE}(i_0) \qquad (12)$$

To satisfy the condition that Equation (9) = Equation (12), and by the cancellation of like terms, it can be shown that:

$$\frac{i_{F0}}{i_5} \cdot \frac{V_6}{i_3 R_3} = 1 \qquad (13)$$

With the establishment of equation (13), it can be seen that a suitable exposure time can be obtained from information based on the stop value, the film sensitivity and the measured brightness of the object.

The collector current of transistor 17 begins to charge the capacitor 16 when the shutter release switch 15 is opened. When the voltage of the capacitor reaches the reference voltage $V_S$ of the comparator 18, the energization of the magnet 19 is terminated. The period of time from the instant when the switch 15 is opened to the instant when the energization of the magnet 19 is terminated is the exposure time.

In the manual mode, the collector current of transistor 17, which charges the capacitor 16 when the armature of the automatic-manual change-over switch 14 is at terminal D (manual), is determined by resistance $R_1$ when the armature of switch 11 is at terminal A. More specifically, the collector current $i_6$ of transistor 13 is given by:

$$i_6 = V_6/R_1, \qquad (14)$$

and the base-emitter voltage $V_5$ of transistor 13 is given by:

$$V_5 = \frac{KT}{q} \ln \frac{i_6}{i_0} + V_{BE}(i_0) \qquad (15)$$

If the resistance $R_1$ is selected to satisfy the following equation with respect to the apex value $T_V'$ of the manual exposure time:

$$R_1 = R_3 \, 2^{(N - T_V')}, \qquad (16)$$

where N is an arbitrary constant defining the mutual correspondency between $A_V - S_V$ and $T_V'$ on the single resistor 12, then the voltage $V_5$ is:

$$V_5 = \frac{KT}{q} \cdot T_V' \ln 2 + \qquad (17)$$

$$\frac{KT}{q} \ln \frac{1}{i_0} \cdot \frac{V_6}{R_3} \cdot \frac{1}{2^N} + V_{BE}(i_0)$$

In order to make equation (17) equal to equation (12) above, it can be shown that:

$$\frac{V_6}{i_5 R_3 \, 2^N} = 1 \qquad (18)$$

With the establishment of equations (13) and (18) for automatic shutter control and manual shutter control, respectively, the following relationship is obtained:

$$\frac{i_{F0}}{i_3} = \frac{1}{2^N} \qquad (19)$$

On the other hand:

$$V_6/R_3 = i_5 \qquad (20)$$

Therefore, if $R_3$ is selected to satisfy equation (20), then the equality of equations (13) and (18) is established, and the variable resistor 12 can be commonly used both as a variable resistor for stop value and film sensitivity in the automatic mode, and as a variable resistor for shutter speed in the manual mode.

Figure 2:
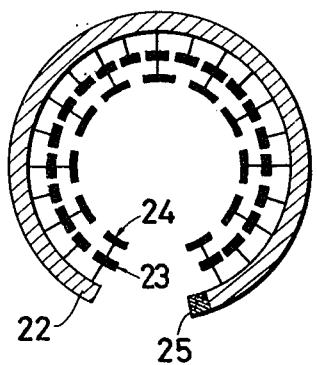
FIG. 2 shows an embodiment of a variable resistor which may be used in the circuit of FIG. 1.

An example of a variable resistor 12 according to this invention is shown in FIG. 2, in which reference numeral 22 designates a resistance element (indicated by the hatching lines), reference numeral 23 designates conductive elements along which the slider B (FIG. 1) travels, reference numeral 24 designates conductive elements along which the slider A travels, and reference numeral 25 designates a common terminal of the variable resistor coupled to the collector of transistor 13.

It will be understood that while the automatic mode of the disclosed embodiment controls exposure time as a function of measured brightness and preset f-stop and film sensitivity values, the principles of the invention are equally applicable to the automatic control of the f-stop or aperture value as a function of measured brightness and preset exposure time and film sensitivity values.

What is claimed is:

1. A shutter control system for a camera having a reflex mirror, comprising:
   (a) an automatic circuit for providing a voltage output for controlling the camera operation as a function of the measured brightness of a photographic object and at least one preset parameter, such as aperture opening, exposure time, and/or film sensitivity,
   (b) a manual circuit for providing a voltage output for controlling the camera shutter speed in accordance with a preset value thereof,
   (c) a variable resistor having a first sliding contact for setting said at least one preset parameter in an automatic mode and a second sliding contact for setting the shutter speed in a manual mode,
   (d) first switch means normally connecting said variable resistor and said first sliding contact exclusively in said automatic circuit and responsive to movement of said reflex mirror for connecting said variable resistor and said second sliding contact exclusively in said manual circuit,
   (e) a shutter control circuit responsive to a voltage connected to an input thereof for controlling the shutter open duration,
   (f) a second switch, manually controllable, for selectively connecting the voltage outputs of said automatic and manual circuits to the input of said shutter control circuit, thereby providing manual selection of automatic and manual modes of operation, and
   (g) indicator means connected to the output of said automatic circuit for displaying the parameter calculated by said automatic circuit, whereby said last mentioned parameter is displayed prior to a photography operation irrespective of the position of said second switch.

* * * * *